United States Patent [19]
Larabell et al.

[11] Patent Number: 5,842,030
[45] Date of Patent: *Nov. 24, 1998

[54] MEMORY STORAGE SYSTEM HAVING SWAPPABLE POWER SUPPLIES

[76] Inventors: Henri Larabell, 5845 Killarney Cir., San Jose, Calif. 95138; Dennis Read Fowler, 739 Anderson Dr., Los Altos, Calif. 94024

[*] Notice: This patent issued on a continued prosecution application filed under 37 CFR 1.53(d), and is subject to the twenty year patent term provisions of 35 U.S.C. 154(a)(2).

[21] Appl. No.: 542,797
[22] Filed: Oct. 4, 1995
[51] Int. Cl.$^6$ ............................... G06F 1/00; G06F 1/18; G06F 1/26
[52] U.S. Cl. .............................. 395/750.08; 395/182.12; 395/750.01
[58] Field of Search ..................... 395/750, 181, 395/182.04, 182.12, 182.13, 750.03, 750.07, 750.08; 365/185.04, 226; 307/43

[56] References Cited

U.S. PATENT DOCUMENTS

| | | | |
|---|---|---|---|
| 4,586,179 | 4/1986 | Sirazi et al. | 395/182.12 |
| 5,204,963 | 4/1993 | Noya et al. | 395/750.01 |
| 5,325,363 | 6/1994 | Lui | 395/182.12 |
| 5,329,491 | 7/1994 | Brown et al. | 365/226 |
| 5,363,335 | 11/1994 | Jungroth et al. | 365/226 |
| 5,428,524 | 6/1995 | Massie | 363/79 |
| 5,471,099 | 11/1995 | Larabell et al. | |
| 5,481,730 | 1/1996 | Brown et al. | 395/750 |
| 5,483,635 | 1/1996 | Kameyama | 395/182.12 |
| 5,557,738 | 9/1996 | Townsley et al. | 395/182.12 |
| 5,604,873 | 2/1997 | Fite et al. | 395/283 |
| 5,610,449 | 3/1997 | Takahashi et al. | 307/43 |
| 5,631,814 | 5/1997 | Zak | 363/37 |
| 5,664,089 | 9/1997 | Byers et al. | 395/182.12 |

OTHER PUBLICATIONS

U.S. Ser. No. 08/384553, Larabell, et al., filed Feb. 2, 1995.

*Primary Examiner*—Ayaz R. Sheikh
*Assistant Examiner*—Raymond N. Phan
*Attorney, Agent, or Firm*—Peninsula IP Group; Douglas A. Chaikin

[57] ABSTRACT

Disclosed herein is a power supply subsystem for use in a system such as a memory storage system. The power supply subsystem includes a housing, redundant load sharing power supplies and a power supply adapter. The power supply adapter includes a voltage offset circuit which enables automatic calibration of redundant power supplies. With redundant power supplies which require a master and a slave, the voltage offset circuit automatically calibrates one power supply to be the master.

18 Claims, 5 Drawing Sheets

MEMORY STORAGE SYSTEM HAVING SWAPPABLE POWER SUPPLIES

CROSS REFERENCE TO RELATED PATENT APPLICATIONS

This patent application relates in subject matter to commonly assigned U.S. Pat. No. 5,471,099 issued Nov. 28, 1995 to commonly assigned U.S. patent application Ser. No. 08/384,553 which was filed Feb. 2, 1995, and to concurrently filed U.S. patent application entitled "Memory Storage System Having Removeable Memory Storage Device Controllers" filed Oct. 4, 1995, the disclosures of each related patent application are incorporated herein by reference.

BACKGROUND OF THE INVENTION

1. Field of the Invention

This invention relates to computers and memory storage systems. More particularly, this invention relates to memory storage systems having swappable elements.

2. Previous Art

Many host systems such as computer systems are sensitive to voltage fluctuations and power surges. Many host systems have memory storage systems. Memory storage systems are particularly sensitive to voltage fluctuations because data may be lost. When a hard disk drive experiences a severe voltage fluctuation, for example, the drive may reset or completely shut down. Data being written to the disk drive during a severe voltage fluctuation may be lost forever.

RAID systems are memory storage systems having multiple memory storage devices and typically include a device controller such as a RAID controller for regulating the memory storage devices. The RAID controllers are sensitive to power supply malfunctions and problems such as voltage fluctuations. A five percent voltage fluctuation, for example, may cause some device controllers to fail. When power related problems disable a RAID controller, the host system may have to be shut down and data may be lost.

Power supply failure occurs and is a one potential cause of power supply problems in many memory storage systems. Replacement of a failed power supply often requires the host system to be powered down, a memory storage system housing opened, the power supply replaced and/or repaired as appropriate, and then the housing reassembled. Power supply replacement can take anywhere from minutes to hours.

Some known systems rely on a power supply subsystem having redundant power supplies. In such subsystems, the first power supply normally provides power to a number of memory storage devices. The other power supply is a backup and provides power to the system when the first power supply fails. Such systems have several disadvantages.

One disadvantage of such known systems having redundant power supplies is when one power supply fails, the other power supply takes time to power up to a desired voltage. This power up period may last fractions of a second, for example and cause voltage fluctuations. Voltage fluctuations lasting a fraction of a second may disturb the operation of electrical devices such as memory storage devices and device controllers.

To address the disadvantage of voltage fluctuations during power up periods, load sharing between redundant power supplies has been proposed. Load sharing permits two or more power supplies in a power supply subsystem to simultaneously operate and supply power to an electrical system such as a memory storage system. Typically one power supply is characterized as being a master power supply. The other power supply or supplies are characterized as being slaves. The master power supply regulates the voltage output by the slaves. The slaves function as current sources.

Another disadvantage of known systems having redundant power supplies is that the memory storage system may have to be shut down during replacement of a failed power supply. Replacement of a failed power supply may also require an attached host computer system to be shut down. What is desired is a memory storage system having power supplies which are replaceable during operation of the memory storage system.

Often, in power supply subsystems which load share, the master power supply has an output voltage which must be calibrated by an operator prior to use. In a typical load sharing power supply subsystem having a single master and a single slave, the master power supply is calibrated at a higher output voltage than the output voltage of the slave (e.g. a 50–100 mili-volt difference). This calibrated difference determines which power supply is the master and which is the slave.

Known systems which employ load sharing power supplies may experience several problems. One problem is that visually identifying a failed power supply as a master or as a slave to facilitate replacement of the failed power supply may be difficult or virtually impossible. The other problem is that the replacement power supply must be calibrated either as a master or as a slave to coincide with the calibration of the failed power supply to facilitate proper replacement of the failed power supply.

Determining whether a power supply in a power supply subsystem is calibrated as a master or as a slave may require testing of the power supply. If a replacement power supply is not calibrated properly and replaces a failed power supply, the power supply subsystem may experience problems stemming from having two power supplies simultaneously attempting to function as the master.

Once a failed power supply is identified as a master, for example, the replacement power supply must be calibrated accordingly. Calibration of the replacement power supply takes time. Improper calibration may undesirably affect output voltages of the power supply subsystem. What is desired is a power supply subsystem having load sharing power supplies which do not require such calibration.

SUMMARY AND OBJECTS OF THE INVENTION

It is an object of the invention to provide a power supply subsystem having redundant power supplies which maintain load voltages within a desired range when one power supply fails.

It is another object of the invention to provide a power supply subsystem which includes voltage offset to enable swappability of power supplies without necessitating calibration of a master power supply.

Accordingly, in a memory storage system connectable with memory storage devices, power supplies with output voltages, and a host system, a power supply subsystem comprises:

a power supply adapter connectable with the power supply, the power supply adapter being connectable with the memory storage system for supplying power to the memory storage devices; and voltage offset circuitry connected to the power supply adapter for causing a voltage offset between the power supply output voltages, whereby, when power supplies connect with the power supply adapter to provide power to the electrical device board, the voltage offset circuitry causes one power supply to sense a higher output voltage than sensed by the other power supply to enable the one power supply to regulate the output voltages.

In a preferred embodiment, power supplies removably connect with the power supply adapter.

In another preferred embodiment, the voltage offset circuitry includes switching circuitry and biasing circuitry. The switching circuitry monitors the power supplies to detect power supply failure. The switching circuitry selectively activates the biasing circuitry in response to detection of power supply failure.

In another preferred embodiment, the voltage offset circuitry includes a switch means, the switch means selectively directs one power supply to function as a master power supply to facilitate hot swappability of the other power supply.

In another preferred embodiment, the power supply adapter includes a sensor line attachable between the power supply adapter and the power supplies. The voltage offset circuitry connects with the sensor line.

It is an advantage of the present invention to provide a power supply subsystem which automatically induces a voltage offset to cause a power supply to be a master.

BRIEF DESCRIPTION OF THE DRAWINGS

For a further understanding of the objects and advantages of the present invention, reference should be given to the following detailed description, taken in conjunction with the accompanying drawings, in which like parts are given like reference numerals and wherein.

DETAILED DESCRIPTION OF THE INVENTION

Figure 1:
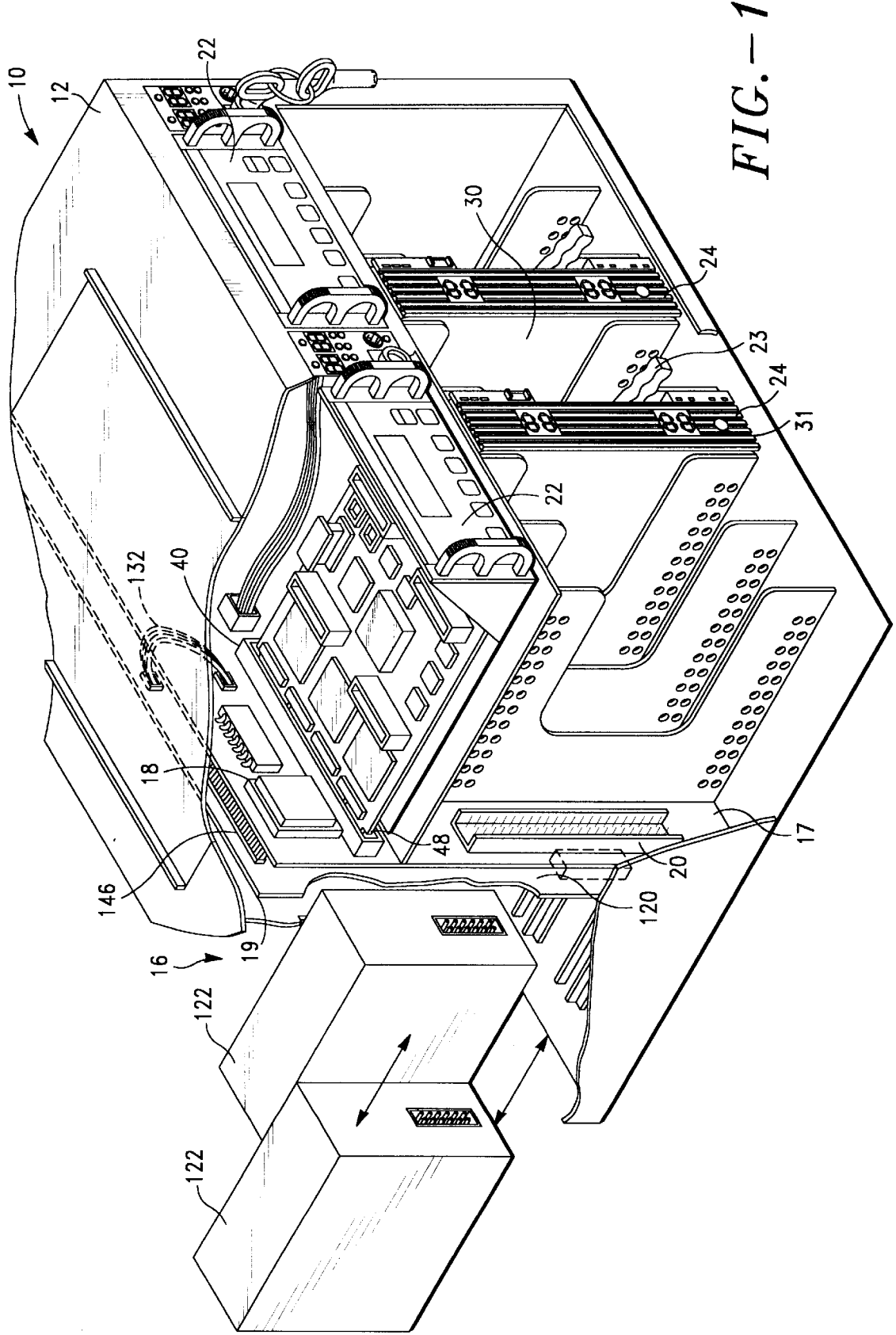
FIG. 1 is a front perspective view of a housing in accordance with the present invention.

With particular reference to FIG. 1, there is shown a memory storage system generally designated with the reference numeral 10. The memory storage system 10 includes memory storage devices 24, device controllers 22, a housing 12, and an electrical device board 17 and a power supply subsystem generally designated with the reference numeral 16. The power supply subsystem 16 includes and a power supply adapter 19 and a pair of removable power supplies 122.

The electrical device board 17 has controller connectors 40 and memory storage device connectors 20. The device controllers 22 and memory storage devices 24 removable attach to the controller connectors 40 and memory storage device connectors 20 respectively to electronically communicate with the electrical device board 17. Removable attachment of the device controllers 22 and of the memory storage devices 24 facilitates removal and replacement of the device controllers 22 and memory storage devices 24.

The housing 12 encloses the memory storage system 10 and the power supply subsystem 16. The housing 12 is configured to hold multiple electrical devices including eight memory storage devices 24, two device controllers 22 and two power supplies 122. Although the housing 12 shown in FIG. 1 is capable of holding a limited number of electrical devices, it can be appreciated that various embodiments of the present invention include a housing 12 adapted to hold a multitude of electrical devices. For example, the housing 12 can be adapted to hold multiple power supplies 122, an array of memory storage devices 24 (e.g. hundreds) and multiple device controllers 22.

The device controllers 22 regulate the memory storage devices 24 to provide redundant storage of data in accordance with any of the various industry accepted RAID standards. In one embodiment of the present invention the device controllers 22 include a commercially available RAID controller having dual SCSI channels and a SCSI host interface. In a variation of this embodiment, the RAID controller includes a Mylex Model 960 Controller such as marketed by Mylex Inc.

The electrical device board 17 interconnects the memory storage devices and the device controllers with a SCSI bus. Accordingly, the electrical device board 17 communicates with the device controllers 22 and memory storage devices 24 via SCSI architecture.

The device controllers 22 periodically poll associated memory storage devices 24. The electrical device board 17 has a microprocessor 18 which periodically polls each device controller 22 to sense environmental factors. Examples of environmental factors include temperature, fan operation, device failure, power failure and removal of a device. In one embodiment, the microprocessor 18 processes the environmental factors and regulates operation of the device controllers 22. In another embodiment, the microprocessor 18 communicates the environmental factors to a host system which, in turn, directs the operation of the device controllers 22.

The controller connector 40 includes a card edge connector 42 which is specifically configured for slidable attachment with a card edge. The card edge connector 42 rigidly attaches to the electrical device board 17.

Each device controller 22 includes a card edge 48. The card edge 48 slidably attaches with the card edge connector 42. The slidable connection between the device controllers 22 and the circuit assembly facilitates swappability of the device controllers 22 when the device controllers 22 are pulled perpendicularly outward from the housing 12. It can be appreciated that various removable controller connectors 40 may be used in accordance with the present invention to ease swappability of device controllers.

When the memory storage system 10 is powered and operates, the device controllers 22 regulate operation of the memory storage devices 24. The device controllers 22 are individually removable from the housing during operation of the system 10. The removal of a device controller 22 is desirable, for example, when one device controller 22 fails and is desired to be swapped with a new controller 22.

In one embodiment, the memory storage device 24 includes a hard disk drive 30 mounted on a hot swappable carrier 23 having display features. The carrier 23 has a display 31 which shows SCSI ID and controller ID of the memory storage device 24. An example of a memory storage device 24 with a hot swappable carrier is disclosed in commonly assigned U.S. patent application Ser. No. 08/384,553, the disclosure of which is incorporated herein by reference. It can be appreciated that multiple memory storage device types can be adapted for use with the present invention including optical disk drives, tape drives and the other devices capable of storing digital data.

The power supply adapter 19 has power supply connectors 120. Each power supply connector 120 removably attaches with a power supply 122. The power supplies 122 produce dual DC output voltages. The power supplies 122 include load sharing circuitry to facilitate current load sharing between the power supplies 122 to facilitate redundancy between the power supplies and to minimize output voltage fluctuations.

In one embodiment, each power supply provides DC power within the range of 50–600 watts. In another embodiment, the power supplies 122 include an AC/DC converter and a pair of DC/DC converters. In another embodiment, the power supplies 122 are commercially available power supplies such as manufactured by Vicor Inc. under the trade name Vicor FlatPac. In another embodiment, each power supply 122 provides dual output of approximately 12 volts and 5 volts.

Figure 2:
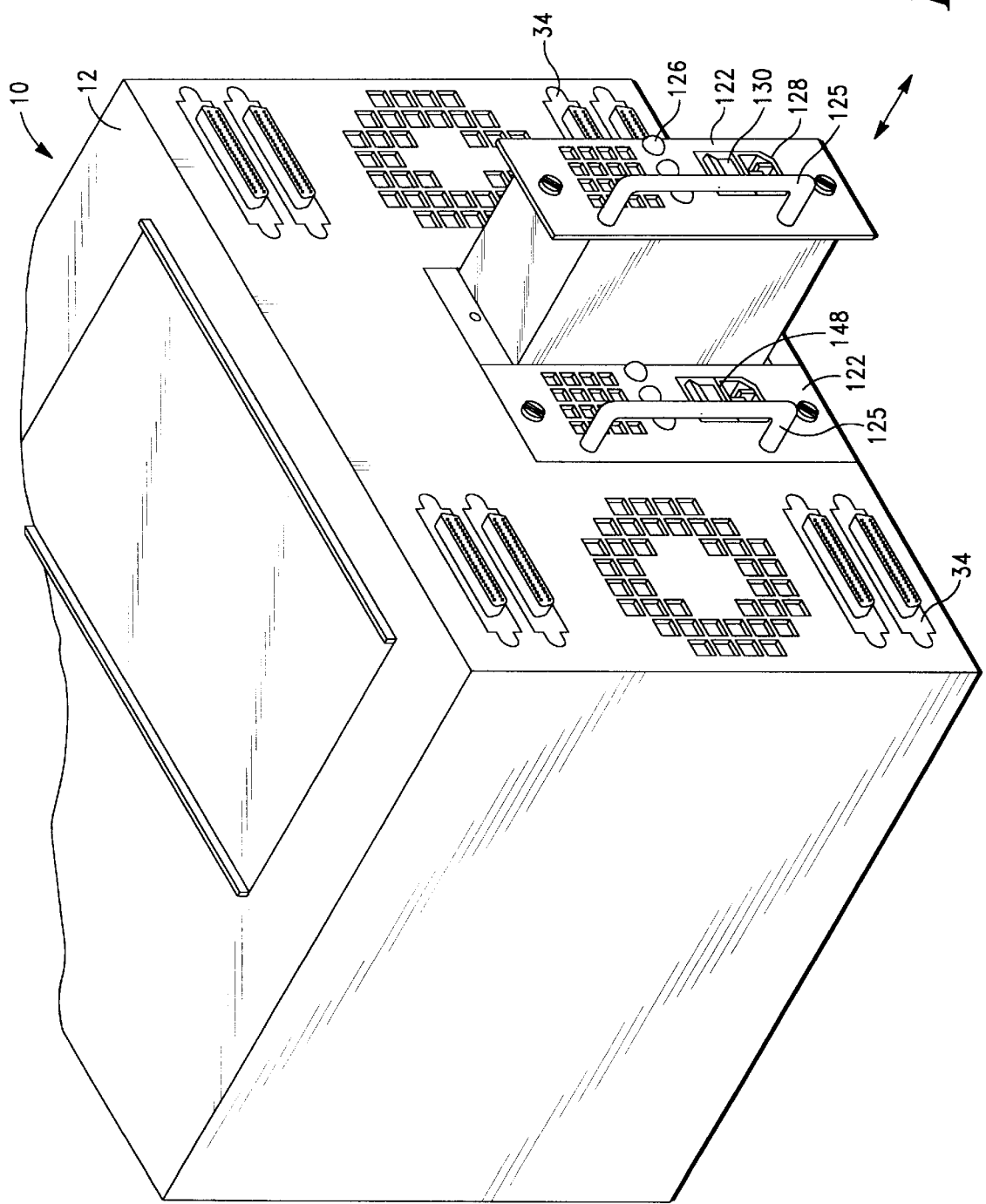
FIG. 2 is a rear perspective view of the housing of FIG. 1.

With particular reference to FIG. 2, there is shown the pair of power supplies 122 inserted into the housing 12. The power supplies 122 function redundantly to provide continuous power to the memory storage system 10 when one power supply 122 fails or is removed. In one embodiment, the power supplies 122 each provide dual output voltages of approximately 5 and 12 volts.

The housing 12 includes host system connectors 34 for attachment with a host system data bus. The host system connectors 34 electronically attach with the electrical device board 17 to enable communication of data between the memory storage system 10 and a host system such as a computer system.

Each power supply 122 includes a handle 125, LED indicators 126, an AC connector 128 and a power switch 130. The power supplies 122 slidably connect with the housing 12 and interconnect with the power supply adapter 19 (FIG. 1).

The LED indicators 126 illuminate to indicate power supply failure, master/slave status and excessive temperature. The AC connector 128 facilitates connection of each power supply with an alternating current source. The handles 125 facilitate slidable removal and replacement of each power supply 122 during operation of the memory storage system 10. The power switch 130 disconnects power from the AC power source to enable selective disconnection of power to a selected power supply 122. In operation, the power switch selectively disconnects AC power to a power supply 122 prior to removal of the power supply 122 from the housing 12.

Figure 3:
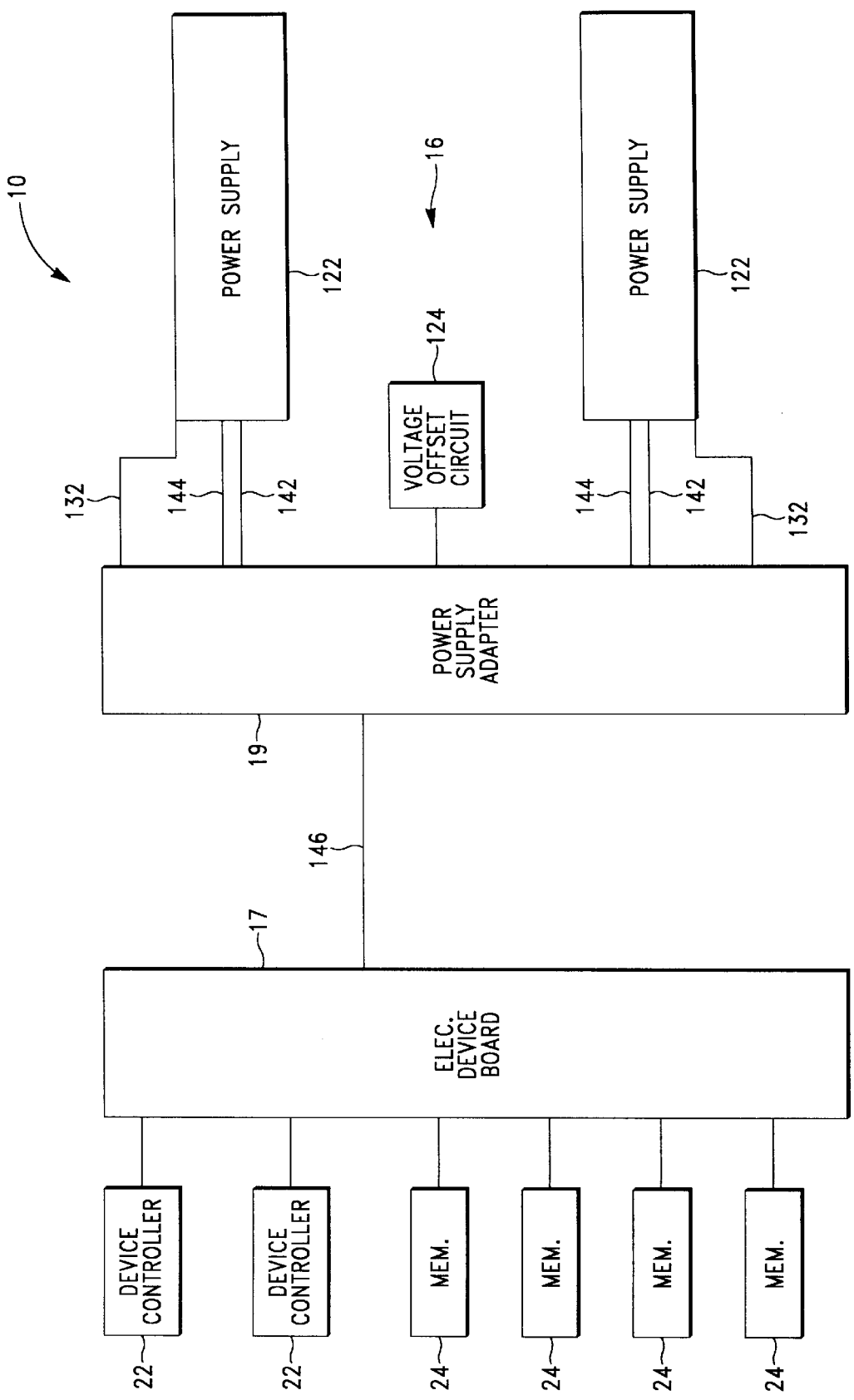
FIG. 3 is a schematic diagram of the system of the present invention.

With particular reference to FIG. 3 there is shown a diagram of the memory storage system 10. The memory storage system 10, includes the power supply subsystem 16, device controllers 22, the memory storage devices, the electrical device board 17, the power supply adapter 19, and power supplies 122.

Sensor lines 132 interconnect each power supply 122 with the power supply adapter 19. The interconnection of the sensor lines 132 at the power supply adapter enables voltage regulation of the power supplies 122 based on voltages sensed external to the power supplies 122. In another embodiment, the sensor lines 132 attach to the electrical device board 17. A bus 146 interconnects the power supply adapter 19 with the electrical device board 17.

A voltage offset circuit 124 attaches to the power supply adapter 19 and electrically communicates with the sensor lines 132.

The power supply adapter 19 includes load sharing circuitry. In one embodiment the power supply adapter 19 includes a load sharing circuit having a Unitrode model UC3907 load share controller microchip.

Figure 4:
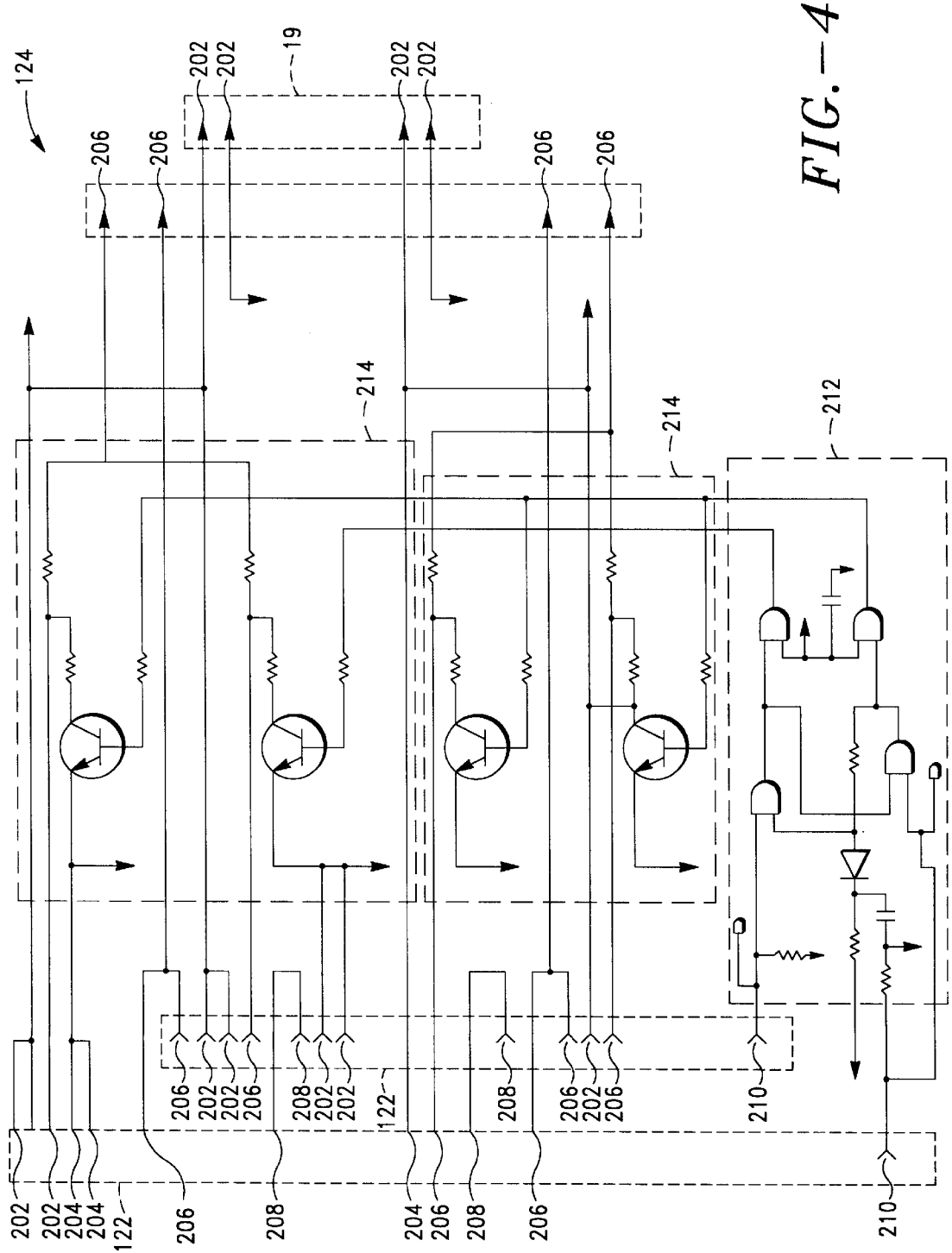
FIG. 4 is a diagram of voltage offset circuitry in accordance with the present invention.

With particular reference to FIG. 4, there is shown the voltage offset circuitry generally designated 124. The circuitry 124 interconnects redundant power supplies 122 with the power supply adapter 19 and facilitates load sharing between the power supplies 122. The circuitry 124 includes current source lines 202, current return lines 204, (+,-) sensor lines 206, current share lines 208, output monitor lines 210, switching circuitry 212, biasing circuitry 214.

Each power supply 122 includes dual output of approximately 12 volts and 5 volts. The current source lines 202 interconnect the power supplies 122 to communicate the dual output from the power supplies 122 to the power supply adapter 19. The sensor lines 206 communicate sensor data through the biasing circuitry 214 and to the power supplies 122 to enable sensing of output voltages produced by each power supply 122.

The monitor lines 210 interconnect the switching circuitry 212 with the power supplies 122. The switching circuitry 212 monitors the power supplies 122. When the switching circuitry 212 detects failure of one power supply 122, e.g. reduction in output voltage, the switching circuitry 212 responds by changing the mode of the biasing circuitry 214 to cause the other power supply 122 to function as a master power supply.

The biasing circuitry 214 induces resistance in the sensor lines 206 to cause one power supply to sense a voltage which is relatively higher than voltage sensed by the other power supply. This sensed voltage difference between power supplies 122 is called a voltage offset. The voltage offset causes the power supply 122 sensing the higher voltage to be a master power supply. In one embodiment, the output voltage of the master power supply is sensed within the range of 50–100 mv higher than the output voltage of the slave power supply. The master power supply regulates the voltage produced by the non-master (e.g. slave) power supply. The slave power supply functions as a current source.

Figure 5:
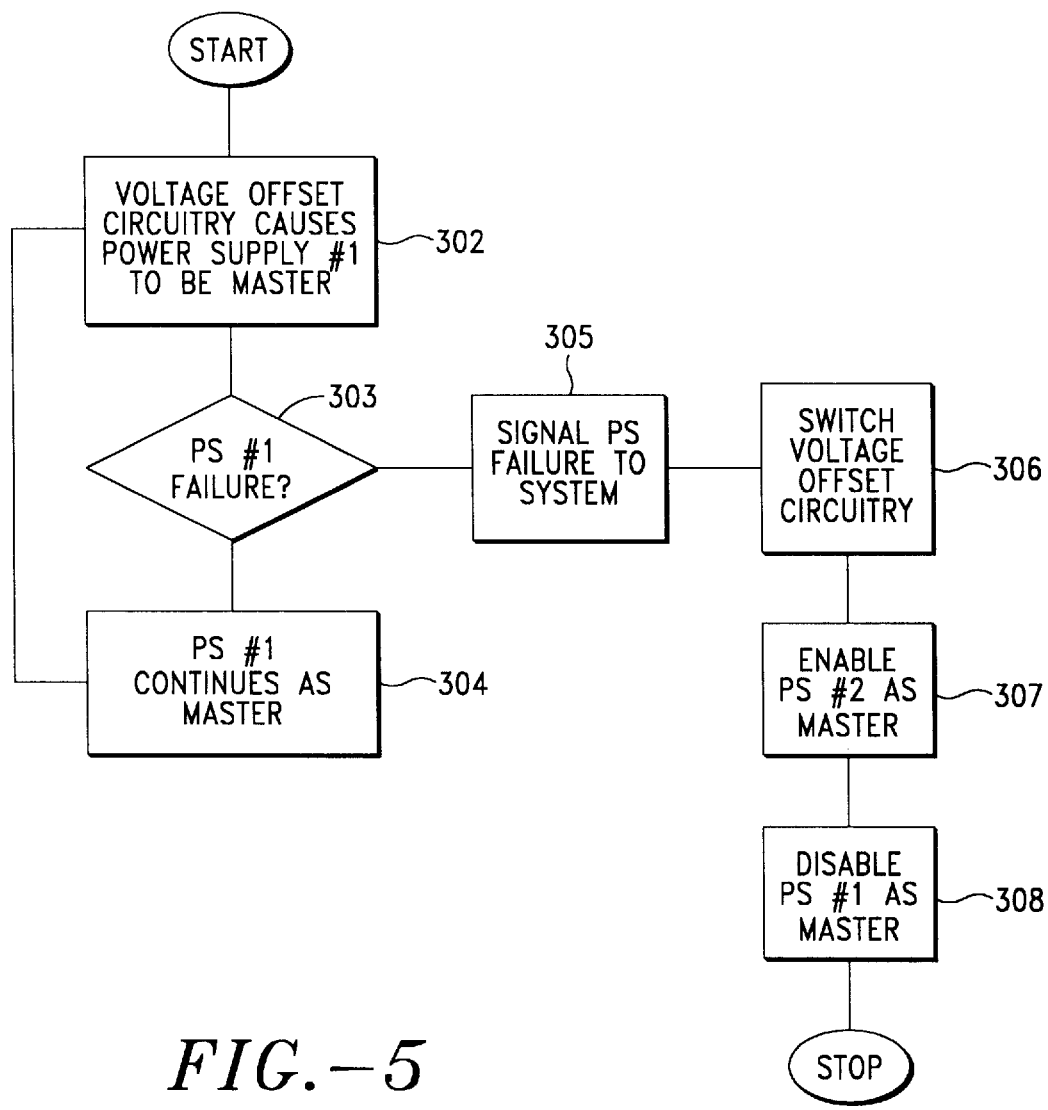
FIG. 5 is a flow diagram describing the voltage offset process.

With particular reference to FIG. 5, operation of the voltage offset circuitry is shown. Two power supplies connect in the power supply subsystem. The voltage offset circuitry 124, by system turn-on preference cause one power supply 122 to be a master (e.g power supply #1). This step is designated by reference numeral 302.

The voltage offset circuitry 124 continually monitors the twelve and five volt outputs of each power supply 122 to detect power supply failure. This is designated by reference numeral 303. Power supply failure is detected when one power supply fails to provide sufficient output voltage. If no power supply failure is detected, the voltage offset circuitry continues to monitor the power supplies. This is designated by reference numeral 304.

When the master power supply fails, the voltage offset circuitry 124 signals the failure to the memory storage system 10. This step is designated by reference numeral 305. The switching circuitry 212 simultaneously causes the biasing circuitry 214 to induce an offset bias voltage drop on the sensor lines 132 of the slave power supply (e.g. power supply #2) and to eliminate some offset bias on the sensor lines 132 of the master power supply. These steps are designated with the reference numerals 307 and 308, respectively.

Accordingly, the slave power supply senses a higher voltage and thus, becomes a master power supply. The slave power supply is then replaceable with a replacement power supply. The replacement power supply becomes the new slave. The replacement power supply, as a slave need not be calibrated to master status.

While the foregoing detailed description describes several embodiments of the memory storage system and power supply subsystem, it is to be understood that the detailed description is illustrative only and not limiting of the scope of the present invention. It can be appreciated that various aspects of the present invention may be modified. For example, the various circuits including the voltage offset circuitry can be changed. Additionally, the present invention can be modified to attach to multiple power supplies. Accordingly, the present invention should be limited only by the claims as set forth below.

What is claimed is:

1. In a memory storage system connectable with memory storage devices, at least two power supplies with output voltages, and a host system, a power supply subsystem comprises:

a power supply adapter connectable with the power supply, the power supply adapter being connectable with the memory storage system for supplying power to the memory storage devices; and voltage offset circuitry connected to the power supply adapter for inducing a voltage offset between the power supply output voltages, wherein, when the at least two power supplies connect with the power supply adapter to provide power to an electrical device board, the voltage offset circuitry induces one of the at least two power supplies to sense a different output voltage than sensed by the remaining ones of the at least two power supplies so as to cause the one power supply to generate a different output voltage than the remaining ones of the at least two power supplies to regulate the output voltages of the remaining ones of the at least two power supplies.

2. A system as set forth in claim 1, wherein the power supplies removably connect with the power supply adapter.

3. A system as set forth in claim 1, wherein the voltage offset circuitry includes switching circuitry and biasing circuitry, the switching circuitry monitors the power supplies to detect power supply failure, the switching circuitry selectively activates the biasing circuitry in response to detection of power supply failure.

4. A system as set forth in claim 1, wherein the voltage offset circuitry includes a switch means, the switch means selectively directs one power supply to function as a master power supply to facilitate hot swappability of the other power supply.

5. A system as set forth in claim 1, wherein the power supply adapter includes a sensor line attachable between the power supply adapter and each of the at least two power supplies, the voltage offset circuits connects with the sensor line.

6. A system as set forth in claim 1, wherein each power supply has an output voltage, a difference between a sensed output voltage of the one power supply and a sensed output voltages of the remaining power supplies is within a range of 50–100 mv.

7. A system as set forth in claim 1, wherein each of the at least two power supplies includes an AC/DC converter and a pair of DC/DC converters.

8. A subsystem as set forth in claim 1 wherein the voltage offset circuitry induces one of the at least two power supplies to sense a lower output voltage than sensed by the remaining ones of the at least two power supplies so as to cause the one power supply to generate a higher output voltage than the remaining ones of the at least two power supplies.

9. A system as set forth in claim 2, wherein the at least two power supplies are Vicor FlatPac type power supplies.

10. A system as set forth in claim 1, wherein each power supply provides DC power within a range of 50–600 watts.

11. A system as set forth in claim 1, wherein each power supply provides dual output of approximately 12 volts and 5 volts.

12. In a memory storage system connectable with memory storage devices, device controllers and a host system, a power supply subsystem comprises:

a housing for holding the memory storage devices and device controllers, the housing being connectable to the host system;

a power supply adapter mounted in the housing and connectable with swappable power supplies having output voltages, the power supply adapter being connected with the memory storage system to supply power to the memory storage devices and to the device controllers; and voltage offset circuitry attached to the power supply adapter for inducing a voltage offset which is sensed between the power supplies, whereby, when power supplies connect with the power supply adapter, the voltage offset circuitry causes one power supply to generate a higher output voltage than the other power supply to automatically enable the one power supply to function as a master power supply.

13. A subsystem as set forth in claim 12, wherein the subsystem includes sensor lines and an electrical device board, the memory storage devices and the device controller removably attach to the electrical device board, the sensor lines attach between the electrical device board and the power supply adapter to sense voltage at the electrical device board.

14. A subsystem as set forth in claim 12, wherein the housing holds swappable memory storage devices and swappable RAID controllers, the RAID controllers electronically attach with the electrical device board to regulate operation of the memory storage devices.

15. A subsystem as set forth in claim 12, wherein the voltage offset circuitry electronically connects with voltage sensor lines, whereby, when a failed power supply and a working power supply connect with the power supply adapter, the voltage offset circuit selectively induces an offset voltage in one sensor line which causes the working power supply to function as a master.

16. A circuit assembly for inducing a voltage offset between at least two redundant power supplies having a master power supply, comprising:

a switching circuitry, the switching circuitry being attached to each of the at least two power supplies to monitor each of the at least two power supplies; and biasing circuitry attached with the switching circuitry, the biasing circuitry responding to the switching circuitry to cause a voltage offset between the power supplies, the biasing circuit inducing one of the at least two power supplies to sense a voltage different than a sensed output voltage of remaining ones of the at least two power supplies to cause the one power supply to generate a different voltage from the remaining ones of the at least two power supplies, the one power supply being designated a master power supply, whereby, when the one power supply fails the switching circuitry automatically causes the biasing circuitry to cause another of the at least two power supplies to be designated the master power supply.

17. A circuit assembly as set forth in claim 16, wherein an electrical device board attaches with the power supplies, a sensor line attaches between the power supplies and an electrical device board, the biasing circuitry attaches with the sensor line to generate an offset voltage in a selected sensor line externally from the power supplies.

18. A circuit assembly as set forth in claim 16, wherein the biasing circuit induces one of the at least two power supplies to sense a lower output voltage than sensed by the remaining ones of the at least two power supplies so as to cause the one power supply to generate a higher voltage than the remaining ones of the at least two power supplies.

* * * * *